United States Patent [19]

Lindell

[11] Patent Number: 4,470,330
[45] Date of Patent: Sep. 11, 1984

[54] TOOLING ASSEMBLY FOR AN IMPACT PRESS

[76] Inventor: Lennart J. Lindell, 1859 Park Ave., Sycamore, Ill. 60178

[21] Appl. No.: 468,565

[22] Filed: Feb. 22, 1983

[51] Int. Cl.³ .............................................. B23D 21/00
[52] U.S. Cl. ......................................... 83/82; 83/179; 83/181; 83/188; 83/198
[58] Field of Search .......... 83/181, 182, 183, 188–195, 83/198, 586, 587, 590, 580, 81, 82, 694, 179

[56] References Cited

U.S. PATENT DOCUMENTS

| | | | |
|---|---|---|---|
| 3,452,572 | 7/1969 | Bramley et al. | 83/198 X |
| 3,735,656 | 5/1973 | Strandell | 83/198 |
| 3,750,505 | 8/1973 | Organ | 83/189 X |
| 3,956,953 | 5/1976 | Lindell | 83/188 |
| 4,245,493 | 1/1981 | Lindell | 72/436 |

OTHER PUBLICATIONS

Huml, "High-Speed Bar Cropping; Fracture Technology for Higher Quality", pp. 50–53 of Wire, Mar./Apr. 1977 issue.

*Primary Examiner*—James M. Meister
*Attorney, Agent, or Firm*—Hill, Van Santen, Steadman & Simpson

[57] ABSTRACT

A tooling assembly for use with a mechanical impact press includes a pair of die blocks which effect cutting of rods, bars and tubes by the rapid misalignment of aligned apertured tools. Realignment is achieved by a reciprocable cam which also limits the extent of misalignment. Means are provided for clamping or dragging the end of a workpiece stock upstream from the prospective cutting plane. A wedge shaped recess adjacent to the aperture of the movable tool or die block provides a high degree of uniformity in workpiece length as measured at various points of a given workpiece. Where the workpiece stock is tubular, a floating mandrel is disposed within the workpiece in the upstream tool or die block while a reciprocable mandrel supports, receives, resizes and discharges the tubular workpiece.

16 Claims, 11 Drawing Figures

FIG. 1
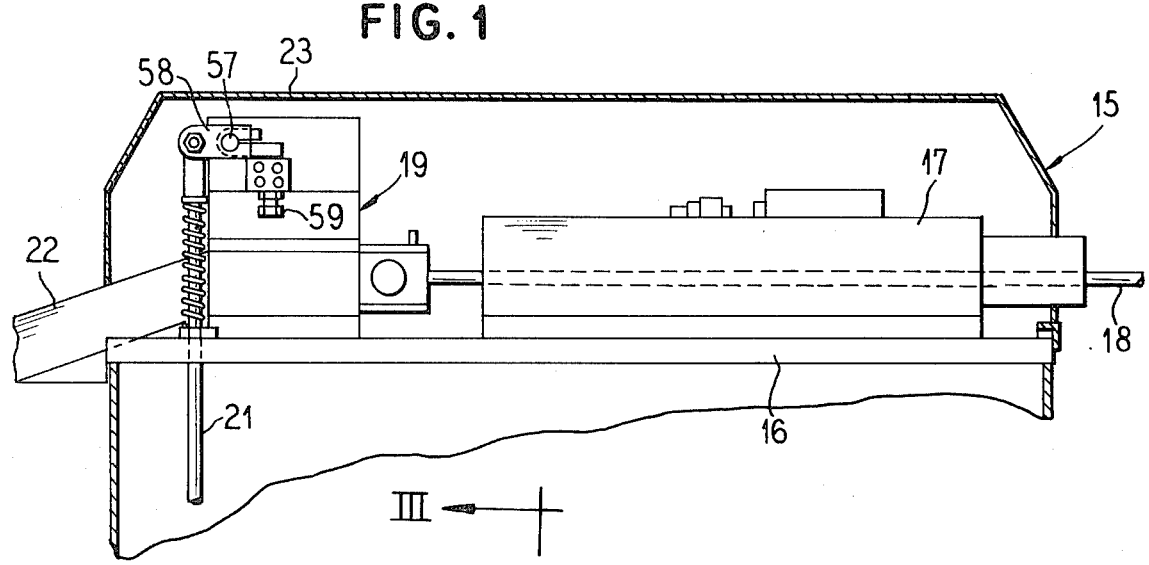
FIG. 2
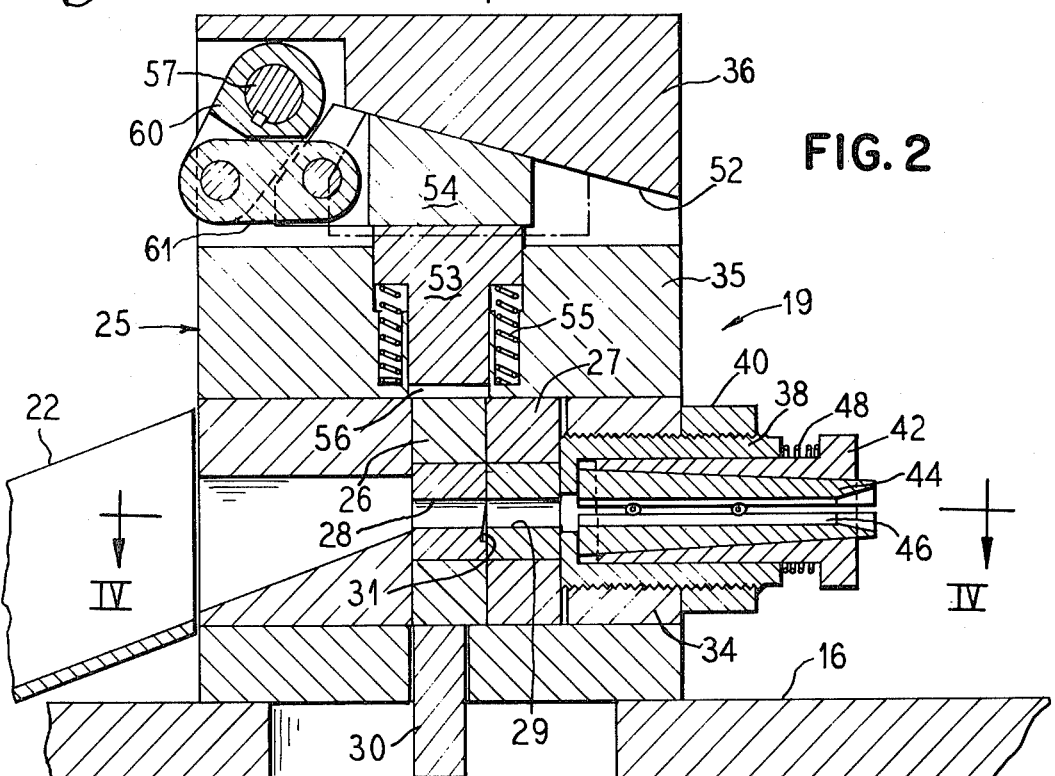
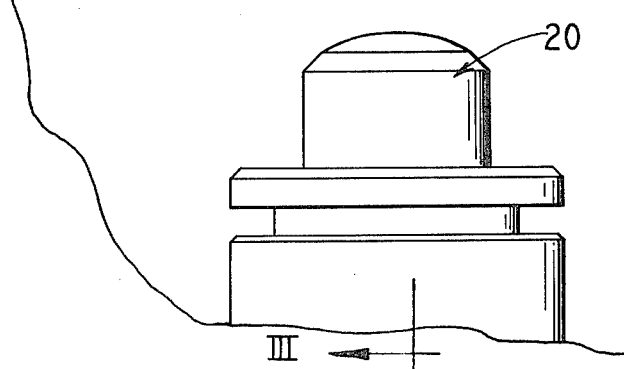

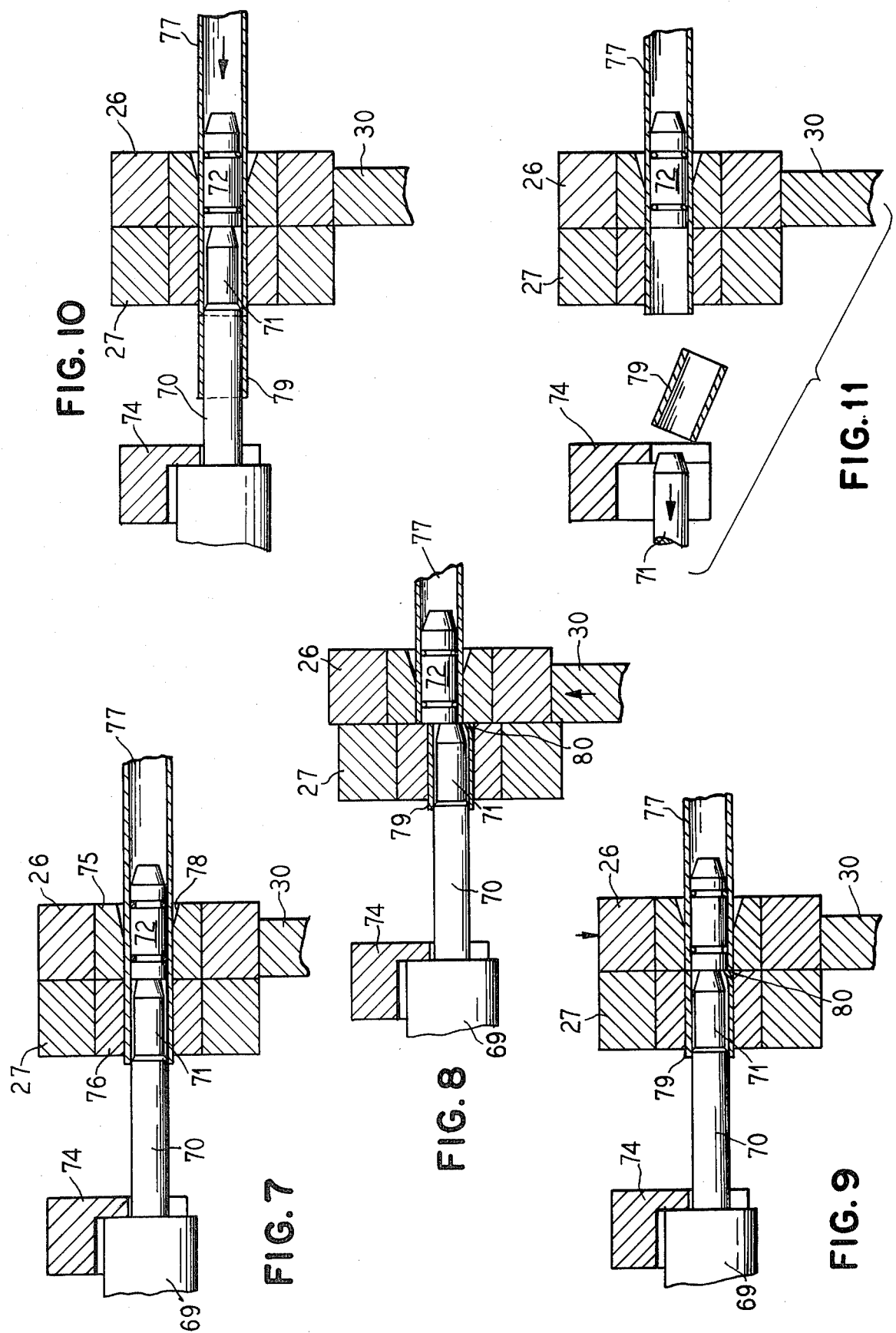

TOOLING ASSEMBLY FOR AN IMPACT PRESS

BACKGROUND OF THE INVENTION

1. Field of the Invention

This invention relates to a tool assembly for use in an impact press for cutting workpiece blanks from elongated stock of workpiece material, such as rods, bars and tubes.

2. Prior Art

An early form of this type of tooling is shown in U.S. Pat. No. 3,735,656. Having worked with this tooling, I found certain disadvantages which arose primarily from the nature of the peripheral equipment required to operate the same. For instance, one of the disadvantages is that an appropriate source of fluid power was needed, a factor which mitigates against the provision of large size tooling and high-speed operation of the press. A later development is shown in U.S. Pat. No. 3,956,953 issued to me. Once more, I relied in part on a suitable source of fluid power, and again there were practical limitations in the cross-sectional size of the workpiece material that could be machined. This earlier tooling also disadvantageously was not capable of handling and cutting tubes to a satisfactory extent, the quality and accuracy of the cut face leaving something to be desired, and hence room for improvement.

SUMMARY OF THE INVENTION

The present invention is directed to a tooling assembly for use with an impact press of the type disclosed in U.S. Pat. No. 4,245,493, issued to me. The patented impact press has only mechanical parts that are actuated by the electrical motor and control system. Thus the present tooling is especially adapted for use with such an impact press, and use of fluid power in the tooling has been eliminated. The cutting is effected by the rapid rectilinear shift of a pair of planar shearing die blocks, one of which is driven by the ram of the impact press. When the movable die block has been shifted to a position of misalignment, a cam, also actuated by the impact press in proper coordinated sequence with the ram, restores the movable die block so that the bores of the die blocks have been realigned to their normally coaxially aligned position. While the die blocks have faces which engage each other flatwise, the movable die block is provided with a recess in such face which is wedge-shaped in cross-section, for improving the quality of the cut workpiece. In addition, an optional mandrel coacting with a floating mandrel enable the tooling to be utilized on tubular material.

Accordingly, it is an object of the present invention to provide a tooling assembly for use with a high-speed mechanically operated impact press.

Another object of the invention is to provide tooling of the type described that can be readily changed and/or serviced.

A still further object of the present invention is to provide tooling of the type described which is capable of being used with tubing.

A still further object of the invention is to provide a precision cut-off with a high quality of cut surface.

Many other advantages, features and additional objects of the present invention will become manifest to those versed in the art upon making reference to the detailed description and the accompanying sheets of drawing in which preferred embodiments incorporating the principles of the present invention are shown by way of illustrative example.

ON THE DRAWINGS

FIG. 1 is an elevational view, with parts broken away, of the tooling assembly of the present invention, illustrated installed on an impact press as disclosed in U.S. Pat. No. 4,245,493;

FIG. 2 is an enlarged vertical cross-sectional view of the tooling assembly mounted on the impact press, and taken along line II—II of FIG. 3;

FIGS. 7-11 are enlarged fragmentary portions of FIG. 6 jointly illustrating a cycle of operation of such structure.

AS SHOWN IN THE DRAWINGS

Figure 6:
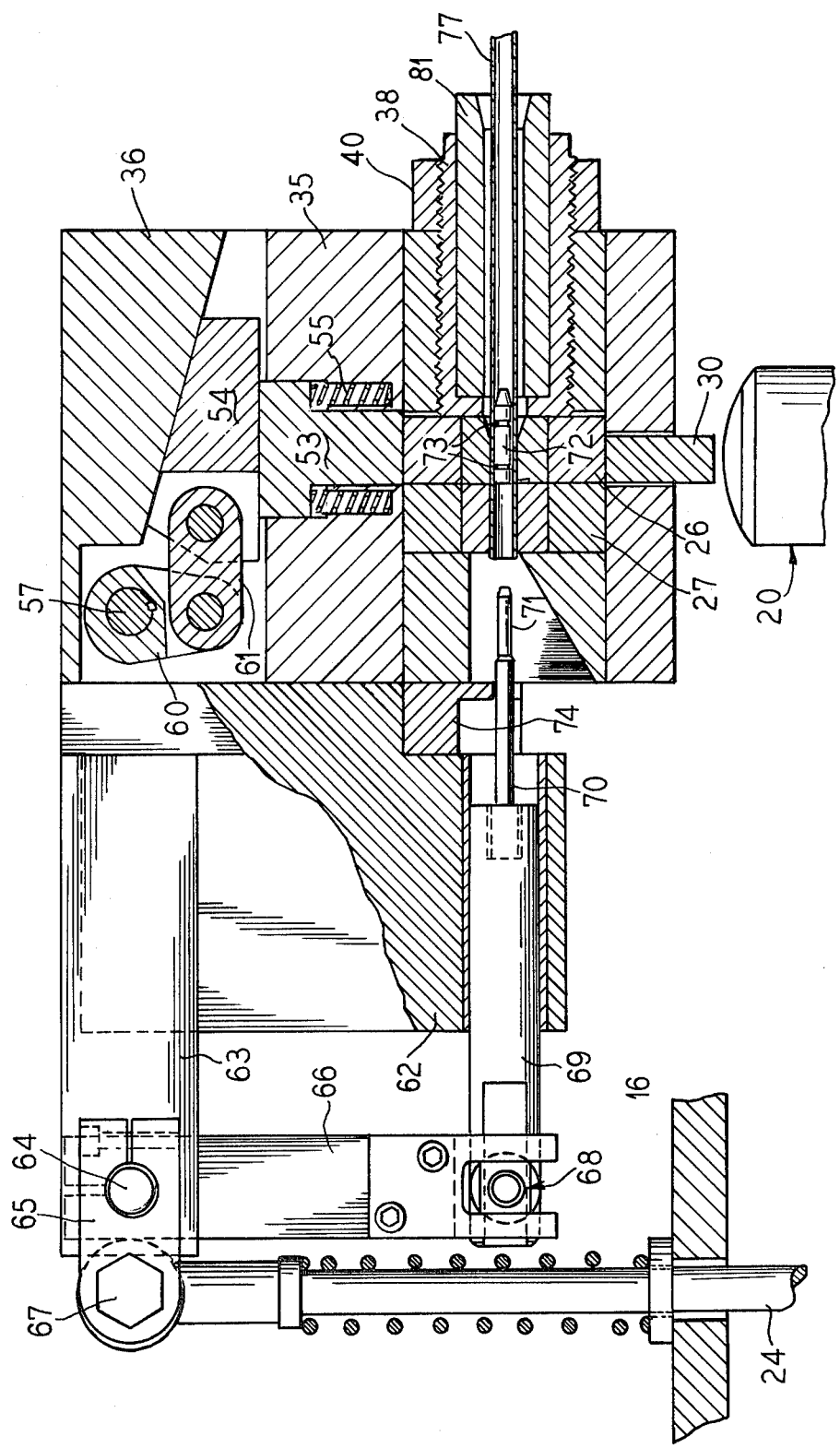
FIG. 6 shows the structure of FIG. 2 as modified by being fitted with appropriate mandrels for cutting tubular material.

An impact press constructed according to U.S. Pat. No. 4,245,493 is fragmentarily illustrated in each of FIGS. 1-3 and 6. The press 15 has a frame 16 on which is supported a feeder 17 by which a rod 18 is fed to a tooling assembly 19 of the present invention. The tooling assembly 19 is disposed on the frame 16 in registration with a vertically reciprocable ram 20 driven by mechanical means (not shown) which also reciprocably drives a rod 21 in a properly synchronized manner. A discharge chute 22 passes from the tooling assembly 19 through a cover 23. When the impact press 15 is used to make tubular workpieces as shown in FIGS. 6-11, the press 15 includes a second reciprocably driven rod 24 (FIG. 6).

Figure 5:
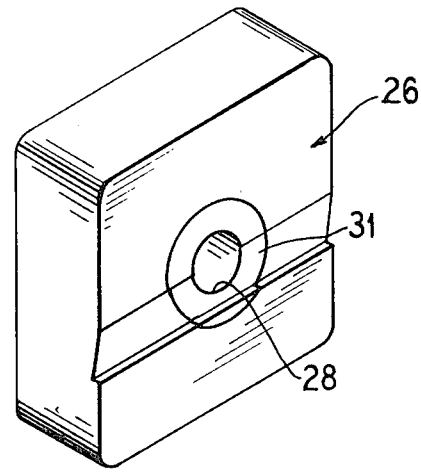
FIG. 5 is an enlarged perspective view of one of the die blocks shown in FIGS. 2-4.

The tooling assembly 19 constructed in accordance with the present invention is best illustrated in FIG. 2. The tooling assembly includes a housing 25 within which there is disposed and is guided a pair of planar shearing die blocks 26, 27 which have confronting faces which engage each other flatwise. Each of the die blocks has a bore 28, 29 which are normally coaxially aligned. One block 26 has a means 30 for being impacted by the ram 20. The die block 26 is guided by the housing 25 to move transversely to the axis of the bores 28, 29, the die block 26 having a wedge-shaped recess 31 shown in cross-section in FIG. 2, in elevation in FIG. 3, and in perspective in FIG. 5. The wedge-shaped recess 31 gradually widens from the axis of the bore 28 to a point beyond the bore.

Figure 3:
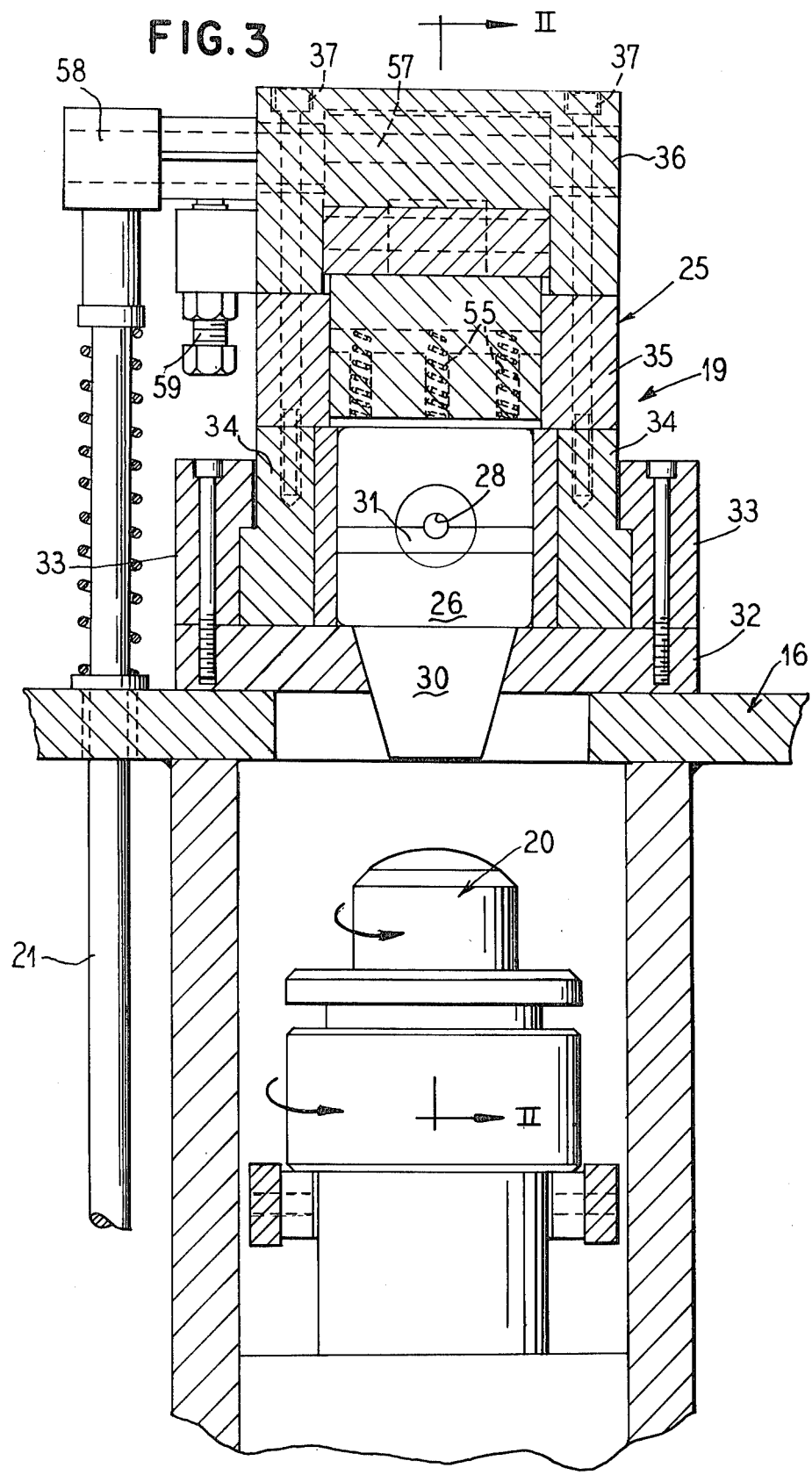
FIG. 3 is a vertical cross-sectional view taken along line III—III of FIG. 2.
Figure 4:
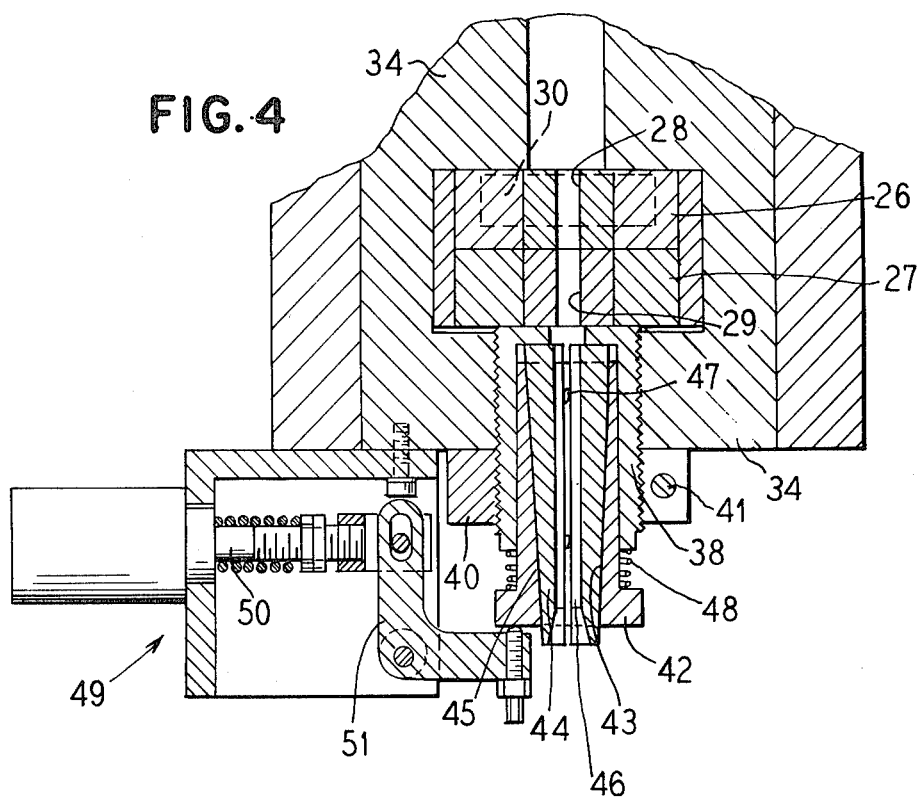
FIG. 4 is a fragmentary cross-sectional view taken along line IV—IV of FIG. 2.

The term "housing 25" as used herein refers to all of the parts which are collectively shaped and bolted together so as to constitute functionally a single rigid block. However, except for FIG. 3, the screws holding the various parts of the housing together have been omitted. As shown in FIG. 3, the housing 25 has a base plate 32 which is secured to the frame 16 of the press 15. The base plate 32 has a pair of clamping blocks 33, 33 which hold a guide block means 34, 34 between which the die blocks 26, 27 are retained and guided. The housing 25 also includes a lower and an upper cap block 35, 36. Access to the die blocks 26, 27 is readily obtained by removing the cap blocks 35, 36 jointly after loosening a set of screws, two of which are illustrated at 37. These are threaded into opposite sides of the housing portion 34 which have a bore therebetween in which the die blocks 26, 27 are disposed. At the upstream end of such bore, the housing portion 34 is threaded as shown in FIGS. 4 and 2. At a central portion of such bore, the die blocks 26, 27 are disposed, and the downstream or outlet end of such bore leads to the discharge chute 22.

A tubular body 38 has external threads which are received in the threaded bore of the housing portion 34. The tubular body 38 thus is disposed upstream of the die blocks 26, 27 and acts against them to hold them in engagement with each other. A split ring clamp 40 is secured to the housing portion 34, and is internally threaded so that with the tightening of a screw 41, the exact axial position of the tubular body 38 is maintained. Within the tubular body 38 there is a sleeve 42 which has a sliding fit within the tubular body 38, the sleeve having an internal taper 43. Within the sleeve 42, there is a split collet 44 which has a tapered exterior surface 45 and an internal bore 46. A number of biasing means in the form of 0-rings 47 tend to expand the collet radially, while the movement of the sleeve 42 regulates such expansion or contraction of the size of the bore 46. Biasing means in the form of a spring 48 urges the sleeve outwardly so as to tend to enable the collet 44 to open. The size of the bore 46 is related to the size of the bores 28, 29 in the die blocks 26, 27. When the collet 44 is expanded, its bore size is greater than that of the die blocks, and when the collet is contracted, its bore size is smaller than the bore size of the die blocks. Further, there is a power-actuated mechanism 49 secured to the housing 25 which is arranged to urge the tapered sleeve 42 inwardly for clamping the collet 44 onto the workpiece stock. The mechanism 49 includes a power-actuated plunger 50 which is spring biased, and a bell-crank 51 interconnecting the plunger 50 with the tapered sleeve 42. Appropriate travel adjustments and stops are provided as shown. The bore 46 of the collet 44 is tapered at its entrant end to facilitate initial reception of the workpiece stock.

As best shown in FIG. 2, the housing cap portion 36 has a downwardly facing fixed cam surface 52, and the lower cap portion 35 of the housing has a transfer block 53 slidably guided by the housing for movement in a direction transverse to the bores 28, 29. A cam 54 is slidably guided in the housing 25 for movement between a first adjustable position shown in FIG. 2 in solid lines and a second fixed position shown in a broken line. The transfer block 53 is biased by a set of springs 55. The springs 55 urge the transfer block 53 against the cam 54 and holds it against the cam surface 52, thus leaving a small space 56 between the movable die block 26 and the transfer block 53. The magnitude of this space is determined by the extent that the cam 54 is retracted from the broken line. The parts as shown in solid lines thus define the maximum travel that can be imparted to the die block 26, a travel which is equal to the maximum rod diameter that the tooling assembly can handle.

Means are provided to enable the cam 54 to be reciprocated by the impact press between the first adjustable position which enables limited die movement and the second fixed position where the clearance 56 is absent. Thus the position of the cam 54 causes die movement to be terminated and any excess energy is reacted on by the housing at the cam surface 52. To this end, there is a shaft 57 which is rockable on the housing 25, a crank arm 58 is adjustably secured to the shaft 57 (FIG. 1), an adjustable stop 59 limiting the ultimate travel in a clockwise direction, and hence limiting the magnitude of the retraction of the cam 54. The crank arm 58 is adapted to be secured to the rod 21 of the impact press so as to be rocked thereby in proper coordinated sequence. On the shaft 57 within the housing 25, there is a pair of links 60, 61 which are hinged together at one end, the link 60 being keyed to the shaft 57 at the other end, and the link 61 being pivotally connected to the cam 54. Thus structure acts between the housing and the enabling means for altering the first position and therefore adjusting the magnitude of the limited movement which the die block 26 may have.

The feeder 17 advances the workpiece by a predetermined precision amount so that the workpiece blank will have its prospective fracture or cutting line at the innerface between the die blocks 26, 27. The mechanism 49 can then be actuated so that the workpiece stock becomes clamped by the collet 44. The cam driven rod 21 has placed the cam 54 in a selected or retracted first position, thereby creating the space 56. The ram 20 is then released and it impacts the block 30 at a high velocity causing the die blocks 26, 27 to move relatively to each other. The ram 20 can be retracted as soon as the die block 26 has stopped its movement and then the push rod 21 of the impact press is pulled positively downwardly causing the shaft 57 to rock in a counterclockwise direction, thus through the links 60, 61 moving the cam 54 to the right, forcing the transfer block 53 to move against the force of its springs 55 and to restore the position of the die block 26 to one of realigned bores 28, 29. Normally the ram 20 is cocked and retracted at this point. The power actuated mechanism 49 may then be deactivated, thus enabling the biasing means or springs 48 to move the sleeve 42 outwardly and to release the workpiece stock, thereby completing one cycle of operation. As a practical matter, this cycle of operation may take place several times a second.

Normally the mechanism 49 is activated just before the end of a first bar enters the feeder 17. Then with a new bar pushing the first bar, feedlength can be controlled with an adjustable drag from the mechanism 49. The drag is there all the time until the new bar end enters the first die block 27, whereafter the drag is released.

When it is desired to have tubular workpiece stock, the mandrel structure of FIG. 6 is added. However, this arrangement may be considered to be a modification in that the movable die block 26 directly confronts the threaded tubular body 38.

The housing 25 has additional portions 62, 63 secured thereto. A shaft 64 is pivotally mounted on the housing portion 63 and has a horizontal crank arm 65 and a vertical crank arm 66 secured thereto. The spring-biased push rod 24 has a pivotal connection 67 with the horizontal crank arm 65, thus normally biasing the shaft 64 in a clockwise direction as shown in FIG. 6, and hence biasing the lower end of the vertical crank arm 66 to the left. The lower end of the vertical crank arm 66 has a pin-and-slot connection 68 with a mandrel holder 69 supporting a mandrel 70. The structure thus described constitutes reciprocation enabling means by which the mandrel 70 can be reciprocated between a first position as shown and a second position wherein the mandrel 70 is shifted into the die block 27 in response to downward movement of the push rod 24. Thus the crank arm 66 functions as a drive arm to drive the mandrel holder 69 and hence the mandrel 70 between said first and second positions, and beyond said first position.

The mandrel 70 has a tapered leading end 71 for entering the tubular stock to engage a floating mandrel 72 disposed in the die block 26. Such engagement occurs in the plane of the flatwise engaging faces of the die blocks 26, 27. The floating mandrel is provided with resilient friction means, here in the form of a pair of O-rings 73, 73. A wiper 74 is carried on the housing for being abutted by tubular workpieces in response to upward movement of the push rod 24 to shift the mandrel holder 69 from the position shown in FIG. 6, to the left.

The sequence of operation of the apparatus with a tubular workpiece is illustrated in FIGS. 7-11.

FIG. 7 illustrates the start of an operating cycle. The die blocks 26, 27 are in a position where the axial bores of their hardened inserts 75, 76 are axially aligned. The floating mandrel 72 is in place and the mandrel 70 projects into the stationary die block 27 with its leading end 71 engaging the end of the floating mandrel 72 in the plane of the interengaging faces of the die blocks 26, 27. The tubular stock 77 is then advanced to the position shown, initial feeding being facilitated by a taper 78 in the die insert 75.

As shown in FIG. 8, the impact means 30 has just been struck by the ram as indicated by the force arrow, thus shearing a tubular workpiece 79 from the tubular stock 77. The distal end of the mandrel 70 is tapered to faciliate feeding the workpiece stock thereon. Such taper provides a small zone of non-support so that during such shearing, the end 80 of the tubular workpiece 79 becomes deformed as shown. The displacement illustrated is to be considered exaggerated for clarity of view, but with such displacement of the die block 26, the end of the workpiece stock 77 and the floating mandrel 72 are likewise displaced.

Next, the cam structure 54 restores the position of the movable die block 26 as shown by the force arrow in FIG. 9. At this point, the parts are in the same position that they were as shown in FIG. 7 except that the tubular workpiece 79 has been sheared off and its end 80 has become deformed.

As shown in FIG. 10, the next step comprises feeding the workpiece stock 77 as shown by the force arrow. The end of the workpiece stock 77 shoves the severed tubular workpiece 79 onto the full diameter of the mandrel 70, a diameter that corresponds to the proper internal diameter of the tubular workpiece 79, thus resizing or restoring the inside diameter by spreading the deformed portion 80 radially outwardly so that it is no longer present. In the even that there might have been any deformation of the leading end of a succeeding workpiece, it too will be reformed as the tubular workpiece 79 is forced onto the full-size portion of the mandrel 70.

As shown in FIG. 11, the mandrel 70 is retracted as indicated by the force arrow causing the tubular workpiece 79 to come into engagement with the wiper 74 which wipes the tubular workpiece 79 from the mandrel 70, permitting it to fall or discharge. Thereafter the mandrel 70 is moved in the opposite direction to the position illustrated in FIG. 7, thereby completing one cycle of operation.

The minimum length of tubular workpiece that can be produced is less than the diameter of the tubular stock 77 and is close to the tube wall thickness. The maximum length of tubular workpiece that can be produced is substantially half the distance from the floating mandrel 72 to the wiper 74. The mandrel 70, as shown in FIG. 6, is threaded to the mandrel holder 69 to facilitate interchange with other mandrels. In the embodiment of FIG. 6, the tapered sleeve and collet have been replaced by a tubular sleeve 81 in that the feeder 17 holds the workpiece stock 77 from axial movement. The boresize of the sleeve 81 is determined by required movement of the die block 26 to allow the workpiece stock 77 to move radially during impact without hitting the bore in the tubular member 81, thereby avoiding any marking of the workpiece 77. The bore of the tubular member 81 corresponds to the diameter of the mouth of the taper 78 to ensure easy feeding of the leading end of the workpiece stock 77 during initial loading.

Although various minor modifications may be suggested by those versed in the art, it should be understood that I wish to embody within the scope of the patent warranted hereon, all such embodiments as reasonably come within the scope of my contribution to the art.

I claim as my invention:

1. A tooling assembly for use with a mechanical impact press having a ram for severing a workpiece blank from an elongated stock of workpiece material, said tooling assembly comprising:
   (a) a housing adapted to be fixedly secured to the impact press;
   (b) a pair of planar shearing die blocks supported by said housing, having faces in flatwise engagement with each other and having normally coaxially aligned bores through which the stock is to pass, one of said die blocks having means for being impacted by the ram, and being guided by said housing for limited movement transverse to its bore in response to such impact; and
   (c) a cam slidably guided in said housing and having means enabling it to be reciprocated by the impact press between a first and a second position, said cam in said first position enabling said limited movement of said die block to an extent such that said bores are out of alignment, and said cam in being driven to said second position acting on said one die block for restoring said bore alignment.

2. A tooling assembly according to claim 1, said cam in said first position terminating said limited movement of said one die block while being reacted on by said housing.

3. A tooling assembly according to claim 1, said enabling means of said cam including:
   (a) a shaft rockable on said housing;
   (b) a crank arm secured to said shaft and adapted to be rocked by the impact press; and
   (c) a pair of links hinged together at one end, one of said links being secured to said shaft at its other end, and the other of said links being pivotally secured to said cam.

4. A tooling assembly according to claim 1, including means acting between said housing and said enabling means of said cam for altering said first position, whereby the magnitude of said limited movement may be adjusted.

5. A tooling assembly according to claim 1, including a transfer block slidably guided by said housing for movement transverse to said bores, and disposed between and engageable with said one die block and said cam.

6. A tooling assembly according to claim 5 including springs biasing said transfer block against said cam and said cam against said housing.

7. A tooling assembly according to claim 1, said face of said one die block having a wedge shaped recess gradually widening from the axis of its bore to a point beyond said bore located toward the ram.

8. A tooling assembly according to claim 1, including:
(a) a tubular body secured to said housing upstream of said die blocks and holding them in said engagement;
(b) a sleeve slidably disposed in said tubular body, said sleeve having an internal taper increasing toward said die blocks;
(c) a collet disposed in said sleeve and having a tapered exterior complemental to and engaging said internal taper, and a bore aligned with said bores of said die blocks, said collet bore normally being slightly larger than said die block bores, and being reducible to a smaller transverse size;
(d) means normally biasing said tapered sleeve in a direction out of said tubular body; and
(e) a power-actuated mechanism on said housing for urging said tapered sleeve in an opposite direction for enabling said collet to act on the stock.

9. A tooling assembly according to claim 8, said power actuated mechanism comprising:
(a) a power-actuated plunger; and
(b) a bell crank interconnecting said plunger and said tapered sleeve.

10. A tooling assembly according to claim 1 for use on tubular stock, comprising:
(a) a mandrel slidably supported on said housing and having means enabling it to be reciprocated by the impact press between a first and a second position, said mandrel in said first mandrel position being adapted to extend into the leading end of the tubular stock in the downstream one of said die blocks, said mandrel in said second mandrel position being retracted from said die blocks;
(b) a floating mandrel being adapted to be received in the tubular stock and to remain during operation in the upstream one of said die blocks; and
(c) a wiper on said housing engageable with the leading end of a severed workpiece on said reciprocable mandrel in response to its retracting movement to strip the severed workpiece therefrom.

11. A tooling assembly according to claim 10 said enabling means of said reciprocable mandrel including:
(a) a shaft rockable on said housing;
(b) a crank arm secured to said shaft and adapted to be rocked by the impact press;
(c) a drive arm secured to said shaft and extending transversely to the path in which said reciprocable mandrel is movable; and
(d) a pin-and-slot type of connection between said drive arm and said reciprocable mandrel.

12. A tooling assembly according to claim 10, said floating mandrel having resilient friction means at its outer surface for preventing unwanted movement thereof within the tubular stock.

13. A tooling assembly according to claim 10, said mandrel having a tapered leading end for entering the tubular stock and engageable with said floating mandrel in the plane of said faces, whereby the trailing end of the workpiece may become distorted in response to its being severed, said mandrel having a sizing portion adjacent to said leading end for restoring the original cross section of the workpiece blank.

14. A tooling assembly for use with a mechanical impact press having a ram for severing a workpiece blank from an elongated stock of workpiece material, said tooling assembly comprising:
(a) a housing adapted to be fixedly secured to the impact press;
(b) a pair of planar shearing die blocks supported by said housing, having faces in flatwise engagement with each other and having normally coaxially aligned bores through which the stock is to pass, one of said die blocks having means for being impacted by the ram, and being guided by said housing for limited movement transverse to its bore in response to such impact;
(c) means in said housing in a first position enabling said limited movement of said one die block to an extent such that said bores are out of alignment, and in a second position acting on said one die block for restoring said bore alignment; and
(d) said face of said one die block having a wedge shaped recess gradually widening from the axis of its bore to a point beyond said bore located toward the ram.

15. A tooling assembly for use with a mechanical impact press having a ram for severing a workpiece blank from an elongated tubular stock of workpiece material, said tooling assembly comprising:
(a) a housing adapted to be fixedly secured to the impact press;
(b) a pair of planar shearing die blocks supported by said housing, having faces in flatwise engagement with each other, and having normally coaxially aligned bores through which the stock is to pass, one of said die blocks having means for being impacted by the ram, and being guided by said housing for limited movement transverse to its bore in response to such impact;
(c) means in said housing in a first position enabling said limited movement of said one die block to an extent such that said bores are out of alignment, and in a second position acting on said one die block for restoring said bore alignment;
(d) a mandrel slidably supported on said housing and having means enabling it to be reciprocated by the impact press between a first and a second position, said mandrel in said first mandrel position being adapted to extend into the leading end of the tubular stock in the downstream one of said die blocks, said mandrel in said second mandrel position being retracted from said die blocks;
(d) a floating mandrel being adapted to be received in the tubular stock and to remain during operation in the upstream one of said die blocks; and
(f) a wiper on said housing engageable with the leading end of a severed workpiece on said reciprocable mandrel in response to its retracting movement to strip the severed workpiece therefrom.

16. A tooling assembly according to claim 15, said mandrel having a tapered leading end for entering the tubular stock and engageable with said floating mandrel in the plane of said faces, whereby the trailing end of the workpiece may become distorted in response to its being severed, said mandrel having a sizing portion adjacent to said leading end for restoring the original cross section of the workpiece blank.

* * * * *